No. 762,138. PATENTED JUNE 7, 1904.
W. E. CARMONT.
ROAD MOTOR VEHICLE.
APPLICATION FILED DEC. 22, 1903.
NO MODEL.
2 SHEETS—SHEET 1.

Witnesses:

Inventor
William E. Carmont
By
James L. Norris
Atty.

No. 762,138. PATENTED JUNE 7, 1904.
W. E. CARMONT.
ROAD MOTOR VEHICLE.
APPLICATION FILED DEC. 22, 1903.
NO MODEL. 2 SHEETS—SHEET 2.
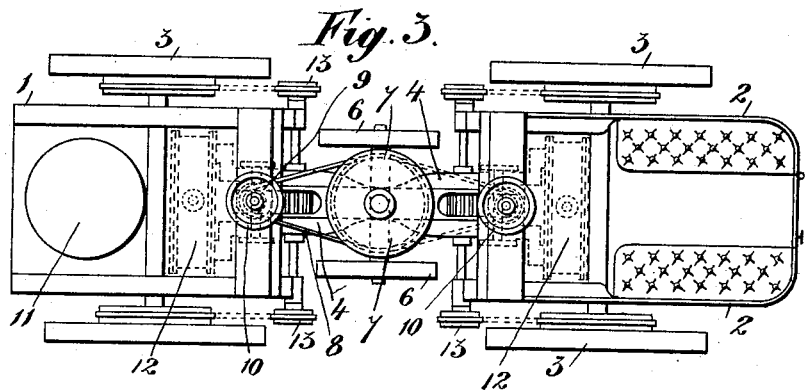
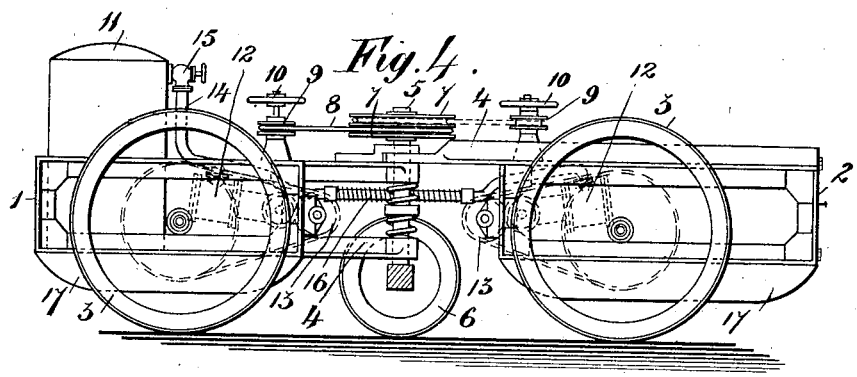
Witnesses:
Inventor
William E. Carmont
By
James L. Norris
Atty No. 762,138.

Patented June 7, 1904.

UNITED STATES PATENT OFFICE.

WILLIAM EDWARD CARMONT, OF KINGSTON-ON-THAMES, ENGLAND.

ROAD MOTOR-VEHICLE.

SPECIFICATION forming part of Letters Patent No. 762,138, dated June 7, 1904.

Application filed December 22, 1903. Serial No. 186,242. (No model.)

*To all whom it may concern:*

Be it known that I, WILLIAM EDWARD CARMONT, a subject of the King of Great Britain, residing at Helmsdale, Kingston-on-Thames, county of Surrey, England, have invented certain new and useful Improvements in Road Motor-Vehicles, of which the following is a specification.

The object of this invention is an improvement connected with road-motors, whereby same may be made of great horse-power and be used as a tractor for wagons, guns, and other heavy vehicles.

For the purpose of my invention I make my motor as one vehicle from two motor-vehicles, one of them containing the steering wheel or wheels, which when the two motor-vehicles are coupled up form the center wheels. Each motor is driven separately or conjointly, and the necessary fuel and power-generating appliances or apparatus are situate with the engines on each motor or on one motor only, in which case the power—say steam—can be conveyed to the engine on the other motor by flexible pipe-coupling and universal joint or by other means, according to the power employed. In some cases one or both of the motor-vehicles may also be provided with means for carrying passengers or goods.

The annexed drawings illustrate examples of carrying my invention into effect.

Figure 1:
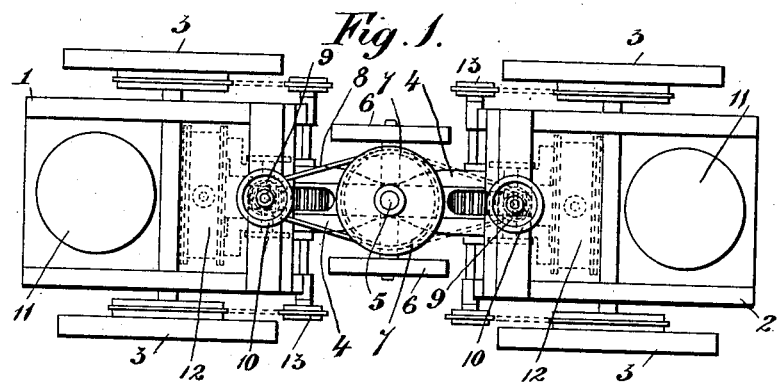
Figure 2:
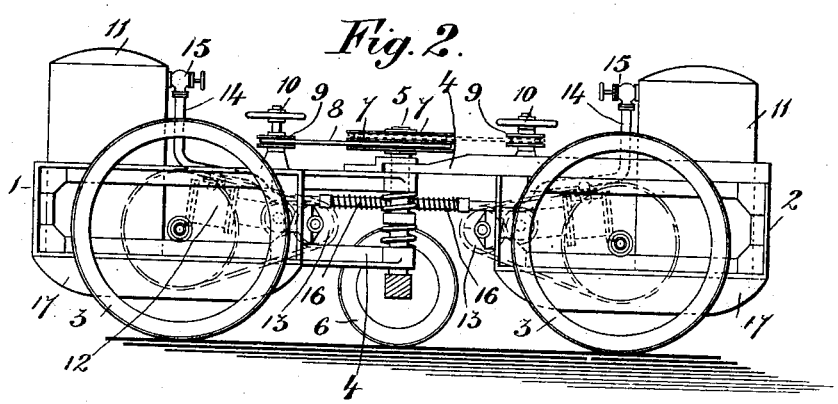

Figure 1 is a plan of a road motor-vehicle for use as a tractor, formed from two motors each driven separately. Fig. 2 is a side elevation of Fig. 1, but with the engines connected by flexible pipe, so that both can be driven by either boiler. Fig. 3 is a plan of a road motor-vehicle for use as a tractor and carrying passengers, formed from two motors each driven separately, as in Fig. 1. Fig. 4 is a side elevation of Fig. 3, but with the engines connected by flexible pipes, so that both can be driven by one boiler.

1 2 are the two motors carried on the wheels 3 and provided with extensions 4, by which they are coupled together, the coupling being effected around the steering-rod 5. The steering-wheels 6 are situate between the two motors, and the steering-rod 5 is provided with two pulley-wheels 7, each carrying a rope or chain 8, which are connected to other pulleys 9 on the handle 10, one on each vehicle, so that the steering can be effected from either motor-vehicle.

In the drawings I have shown the construction for steam motive power; but other motive power can be employed, according to desire.

11 is a boiler, 12 the engine, and 13 the driving-gear for communicating the motion from the crank-shaft to the wheels 3, this mechanism being of the usual construction and according to the power employed.

Only one motor need be used when required for a small load; but when a heavy load is to be moved or when steep gradients have to be traversed then both motors are employed, as shown in Figs. 1 and 3; but Figs. 2 and 4 illustrate complete vehicle, which can be employed for light or heavy loads and to meet all contingencies, this being effected by providing the pipe 14, connecting the steam-chest of the boiler with a valve 15, so that the steam can be cut off when desired, and by connecting each set of engines 12 12 by a flexible pipe 16, capable of being uncoupled, so that both engines can be worked by one boiler when running light loads, and when heavy loads are driven or steep gradients traversed both boilers may be employed.

In Figs. 3 and 4 one motor is provided with seats for passengers, but can also be employed for haulage purposes.

17 17 are tanks formed in the frame for containing water to keep the boilers supplied.

What I claim, and desire to secure by Letters Patent, is—

1. In a motor-vehicle comprising a plurality of wheeled body-sections, means intermediate the sections for pivotally connecting the same and provided with steering-wheels, and means carried by each of said sections for actuating the steering-wheels.

2. A motor-vehicle comprising two wheeled sections pivotally connected to one another and having independent driving mechanism, steering-wheels carried by the pivotal connection intermediate the section, and means for actuating the same.

3. A motor-vehicle comprising two wheeled body-sections pivotally connected together and having independent driving connections, steering-wheels intermediate of the sections and carried by the pivotal connections, and means carried by each of the sections for actuating the same.

4. A motor-vehicle comprising a frame of two sections having driving-wheels, driving-motors for the sections, steering-wheels intermediate of the sections and pivotally connecting the same, and means for actuating the steering-wheels.

5. A motor-vehicle comprising a plurality of sections having driving-wheels, driving-motors for each section, steering-wheels intermediate the sections and pivotally connecting the sections, and hand-operable means carried by each of the sections for controlling the steering-wheels.

In testimony whereof I have hereunto set my hand in presence of two subscribing witnesses.

WILLIAM EDWARD CARMONT.

Witnesses:
PERCY E. MATTOCKS,
HUGH HUGHES.